United States Patent
DeRees et al.

[19]
[11] Patent Number: 5,879,042
[45] Date of Patent: Mar. 9, 1999

[54] COUPLERS FOR CAR BODY PARTS

[75] Inventors: Delbert D. DeRees, Romeo; Donald E. Jay, Troy, both of Mich.

[73] Assignee: DaimlerChrysler Corporation, Auburn Hills, Mich.

[21] Appl. No.: 546,457

[22] Filed: Oct. 20, 1995

[51] Int. Cl.$^6$ ................................................. B62D 27/00
[52] U.S. Cl. ........................... 296/29; 296/197; 403/305
[58] Field of Search ................................. 296/3, 29, 196, 296/197, 36; 403/305

[56] References Cited

U.S. PATENT DOCUMENTS

| | | | |
|---|---|---|---|
| 888,499 | 3/1908 | Smith | 403/305 |
| 1,024,615 | 4/1912 | Brown | 403/305 X |
| 1,073,614 | 9/1913 | McDearmid | 403/305 X |
| 1,158,895 | 11/1915 | Clark | 403/305 |
| 2,947,566 | 8/1960 | Tower | 296/3 X |
| 3,794,375 | 2/1974 | Woodward | 296/36 |
| 4,398,763 | 8/1983 | Louw | 296/3 |
| 4,537,534 | 8/1985 | Marsh, Jr. | 403/305 X |
| 5,143,416 | 9/1992 | Karapetian | 296/29 |
| 5,320,403 | 6/1994 | Kazyak | 296/205 X |
| 5,397,115 | 3/1995 | Vlahovic | 296/29 |
| 5,403,062 | 4/1995 | Sjostedt et al. | 296/181 |

FOREIGN PATENT DOCUMENTS 591042  8/1977  Switzerland ........................... 403/305

Primary Examiner—Joseph D. Pape

[57] ABSTRACT

A box-like coupler for coupling a first car body part to another which includes a box-like device having a closed perimeter of a plurality of sides and two open ends. The box-like coupler may have a center rib between the two open ends which extends to all of the sides of the plurality of sides. Another embodiment is a winged coupler for coupling a first car body part to another which includes a device having a first wing and a second wing connected to the first wing. Each wing of the device has at least one distal width which is greater than a proximal width of the same wing. The winged coupler may have a middle between the first and second wings, an upper surface, a lower surface, two sides connecting the upper and lower surfaces, two ends connecting the upper and lower surfaces, one end being an end of the first wing and the other end being the end of the second wing, a pin extending outwardly from the upper surface at the middle of the device, a pin extending outwardly from the lower surface at the middle of the device, and a recess in the upper surface of each wing. In addition, at least one of the two sides of the device may be V-shaped so that the upper surface at the middle of the device is narrower than the upper surface at the ends of the device.

2 Claims, 3 Drawing Sheets

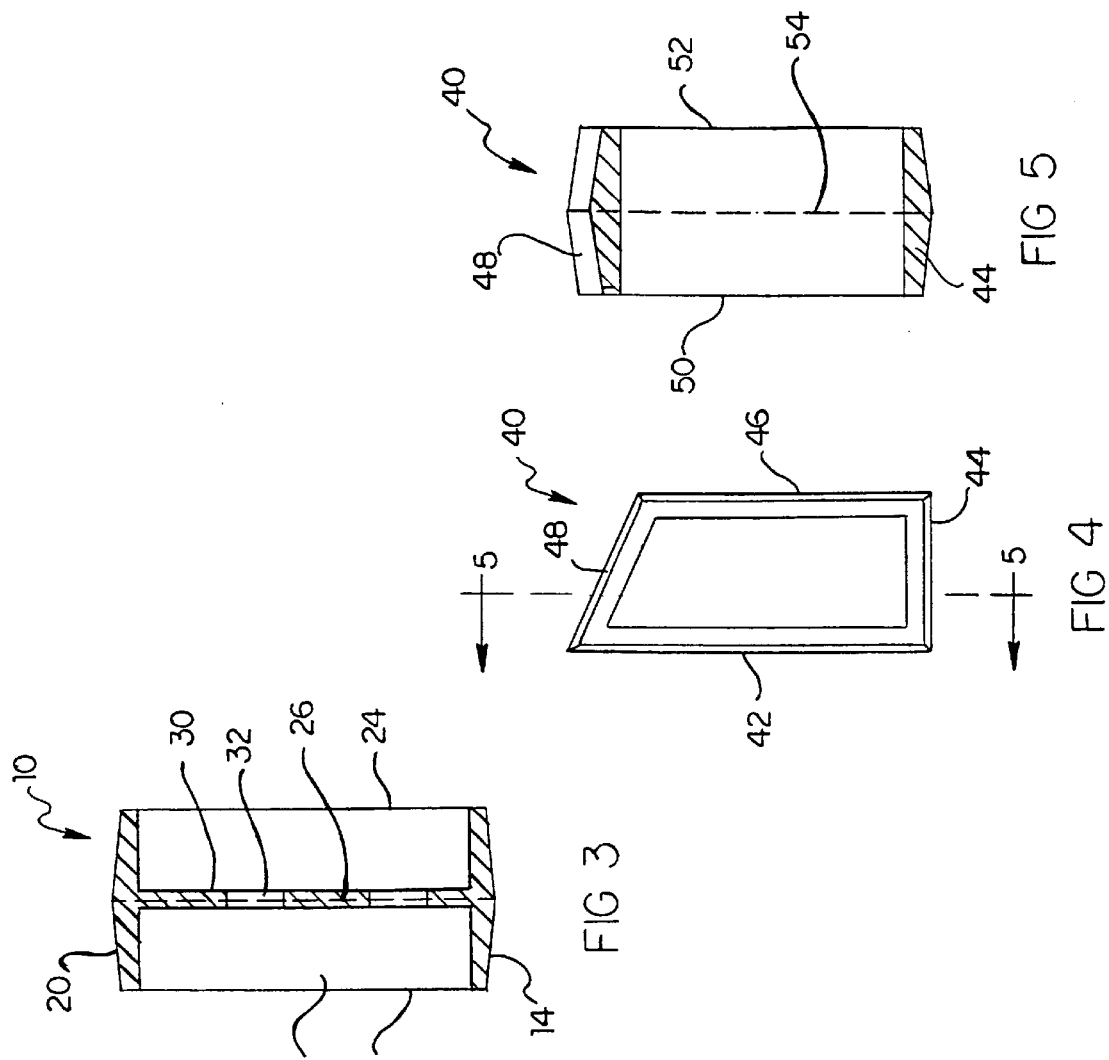

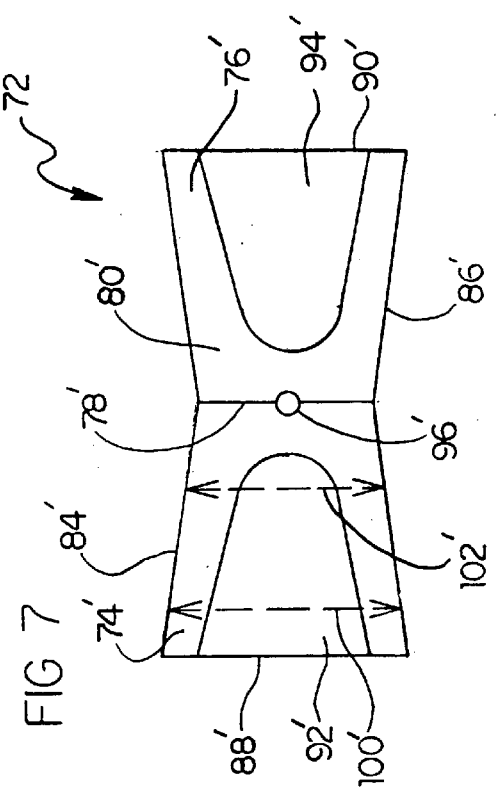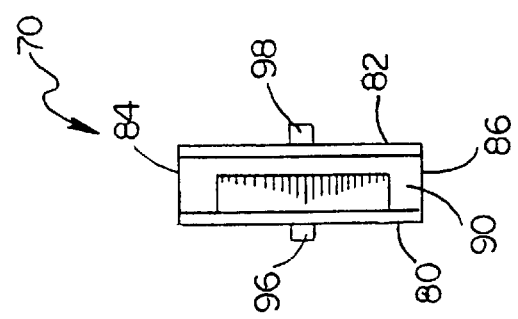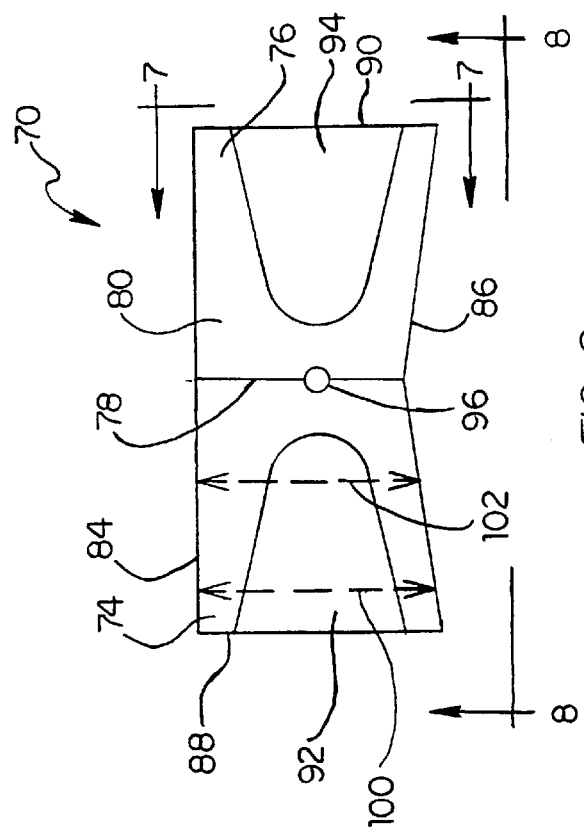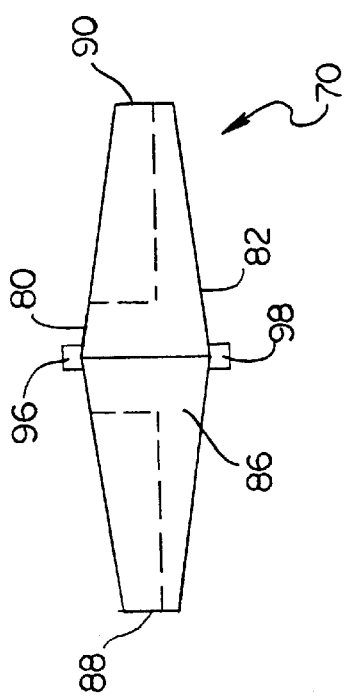

COUPLERS FOR CAR BODY PARTS

BACKGROUND OF THE INVENTION

1. Field of the Invention

The present invention relates generally to couplers for car body parts and, more particularly, to couplers for car body panels.

2. Description of the Related Art

In the automobile industry, there is continually a need for improved couplers to couple one car body part to another car body part, such as one car body panel to another. Advantageously, the improved couplers would serve a function other than the primary function of coupling, such as providing support or reinforcement to the connected car body parts.

As the current trend in automobiles is toward lighter vehicles, it would also be advantageous to have improved couplers which are lightweight and may be secured with adhesive and, optionally, mechanical fasteners such as rivets.

An especially well-designed coupler would couple two parts together not only through the use of an auxiliary fastening means, such as an adhesive, but would also couple two parts together and prevent their separation in a direction of force by the shape of the coupler itself. It is also desirable that the coupler have means for positioning the coupler into the proper location between the two body parts.

It is, therefore, one object of the present invention to provide an improved coupler useful for coupling one car body part, such as a car body panel, to another car body part, such as another car body panel.

It is another object of the present invention to provide an improved coupler which is useful for coupling one car body part to another while serving an additional function, such as providing support or reinforcement to the coupled body parts.

It is yet another object of the present invention to provide an improved coupler useful for coupling one car body part to another which is lightweight and may be secured in place with adhesive and, optionally, mechanical fasteners.

It is still another object of the present invention to provide an improved coupler useful for coupling one car body part to another which is shaped to prevent separation of the two car body parts when forces in certain directions attempt to pull the car body parts apart.

It is finally a further object of the present invention to provide an improved coupler useful for coupling one car body part to another having means for locating the proper position of the coupler between the two car body parts.

SUMMARY OF THE INVENTION

To achieve the foregoing objects, one embodiment of the present invention is a box-like coupler for coupling a first car body part to a second car body part which includes a box-like device having a closed perimeter of a plurality of sides and two open ends. The first and second car body parts are each to be secured to at least a portion of the closed perimeter of the device.

The box-like coupler may have a centerline between the two open ends dividing the coupler in half, each half being symmetric with the other. The box-like coupler may also have a center rib between the two open ends which extends to all of the sides of the plurality of sides.

Another embodiment of the present invention is a winged-coupler for coupling a first car body part to a second car body part which includes a device having a first wing and a second wing which is connected to the first wing. Each wing of the device has at least one distal width which is greater than a proximal width of the same wing. The first car body part is to be secured to the first wing and the second car body part is to be secured to the second wing.

In a more specific embodiment, the winged coupler includes a device having a first wing, a second wing connected to and symmetric with the first wing, a middle portion between the first and second wings, an upper surface, a lower surface, two sides connecting the upper and lower surfaces, two ends connecting the upper and lower surfaces, one end being an end of the first wing and the other end being the end of the second wing, a pin extending outwardly from the upper surface at the middle of the device, a pin extending outwardly from the lower surface at the middle of the device, and a recess in the upper surface on each wing. In addition, at least one of the two sides of the device is V-shaped so that the upper surface at the middle of the device is narrower than the upper surface at the ends of the device.

Other objects, features, and advantages of the present invention will be readily appreciated as the same becomes better understood after reading the subsequent description taken in conjunction with the appendant drawings.

BRIEF DESCRIPTION OF THE DRAWINGS

FIG. 1 is a side view of a box-like coupler of the present invention.

FIG. 2 is a sectional view of the box-like coupler of FIG. 1, the section taken along line 2—2.

FIG. 3 is a sectional view of the box-like coupler of FIG. 1, the section taken along line 3—3.

FIG. 4 is a side view of an box-like coupler of the present invention.

FIG. 5 is a sectional view of the box-like coupler of FIG. 4, the section taken along line 5—5.

FIG. 6 is a top view of a winged coupler of the present invention.

FIG. 7 is an end view of the winged coupler of FIG. 6 as seen from line 7—7.

FIG. 8 is a side view of the winged coupler of FIG. 6 as seen from line 8—8.

FIG. 9 is a top view of another winged coupler of the present invention.

DESCRIPTION OF THE PREFERRED EMBODIMENT(S)

Figure 11:
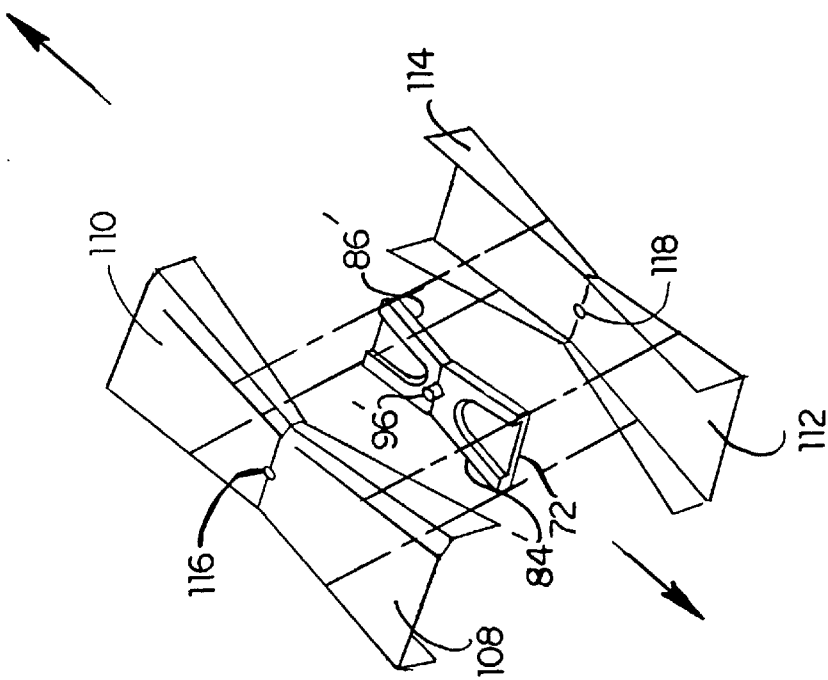
FIG. 11 is an exploded perspective view of the winged coupler of FIG. 9 shown in relationship with some car body parts.

Referring to the Drawings, wherein like reference characters designate corresponding parts throughout the Figures thereof, FIGS. 1—3 show various views of a box-like coupler of the present invention which is a box-like device generally indicated by reference numeral 10. Box-like coupler 10 is useful for coupling at least two car body parts together.

FIG. 1 shows a side view of box-like coupler 10. FIG. 2 shows a sectional view of box-like coupler 10, the section taken along line 2—2 of FIG. 1. FIG. 3 is a sectional view of box-like coupler 10, the section taken along line 3—3 of FIG. 1.

Box-like coupler 10 includes a plurality of connected sides, namely, sides 12, 14, 16, 18, and 20 which form a closed perimeter for box-like coupler 10. Box-like coupler 10 has a corner where every two sides meet. Box-like coupler 10 also includes open ends 22 and 24 and longitudinal centerline 26 between open ends 22 and 24 which divides box-like coupler 10 into two symmetric halves.

As shown in FIGS. 1–3, sides 12, 14, 16, 18, and 20 are tapered from longitudinal centerline 26 of box-like coupler 10 to open ends 22 and 24 so that box-like coupler 10 is wider along centerline 26 and more narrow at open ends 22 and 24. The tapering is not critical to the present invention but is presented in box-like coupler 10 to illustrate that the outside of box-like coupler 10 may be shaped to matingly fit the surface of the car body parts (not shown) which the coupler will couple together.

Also as shown in FIGS. 1–3, sides 16 and 18 of box-like coupler 10 have holes 28 therethrough so that mechanical fasteners, such as rivets, may be passed through the holes to connect box-like coupler 10 to the desired car part. In the present invention, such holes may be absent or may be in one or more sides of the box-like couplers.

Box-like coupler 10 also includes center rib 30 between open ends 22 and 24 which extends to all of the sides of the closed perimeter. Center rib 30 has holes 32 therethrough. Holes 32 render box-like coupler 10 more lightweight. In addition, if box-like coupler 10 is used in an area of the car body, such as the plenum, holes 32 allow air to pass through the coupler for increased air flow. Center rib 30 adds significant reinforcement to box-like coupler 10.

FIGS. 4 and 5 show another embodiment of the present invention which is a box-like coupler useful for coupling at least two car body parts together and is designated by reference numeral 40. Box-like coupler 40 has a plurality of sides, sides 42, 44, 46, and 48, which form a closed perimeter. Box-like coupler 40 also has open ends 50 and 52 and longitudinal centerline 54.

Like box-like coupler 10, the sides of box-like coupler 40 are tapered from longitudinal centerline 54 to open ends 50 and 52 so that box-like coupler 40 is wider along longitudinal centerline 54 and more narrow at open ends 50 and 52 as shown in FIGS. 4 and 5. Once again, the tapering is not critical to the present invention, but is presented in box-like coupler 40 to illustrate that the outside of box-like coupler 40 may be shaped to matingly fit the tapered surface of the car body parts which the coupler is designed to couple together.

Unlike box-like coupler 10, box-like coupler 40 does not have a center rib; however, like box-like couple 10, box-like coupler 40 is divided by its longitudinal centerline (54) into two symmetric halves.

In accordance with the various embodiments of the box-like couplers of the present invention, box-like couplers 10 and 40, may be formed from materials such as metal or plastic.

Generally, with the present invention, each car body part to be coupled is secured to at least a portion of the closed perimeter of a box-like coupler such as box-like coupler 40. Usually, each car body part contacts only part of the closed perimeter of the box-like coupler, and each car body part is secured to a different part of the closed perimeter of the box-like coupler.

Figure 10:
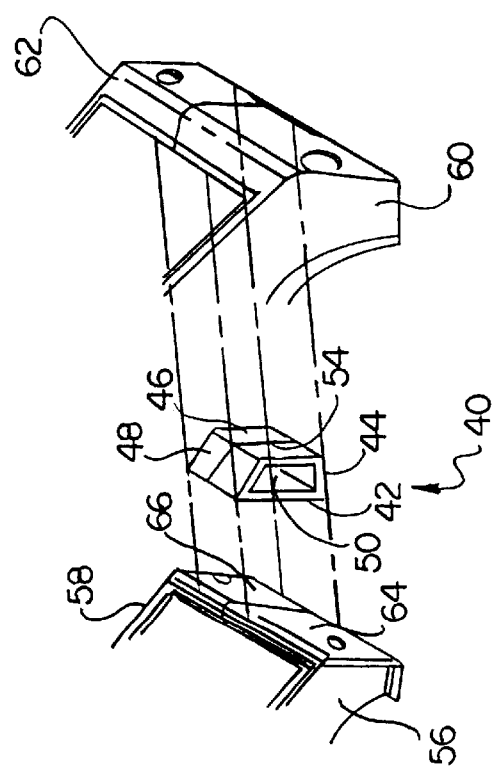
FIG. 10 is an exploded perspective view of the box-like coupler of FIG. 4 shown in relationship with some car body parts.

One way to use the box-like couplers of the present invention is illustrated in FIG. 10 in which car body parts 56, 58, 60, and 62 are to be coupled together using box-like coupler 40. Car body part 56 has an outside surface 64, and car body part 58 has an outside surface 66. Car body parts 56 and 58 (shown in part) are abutted together and form an inner car body panel assembly, and car body parts 60 and 62 (shown in part) are abutted together and form an outer car body panel assembly. The outside surface of side 42 of box-like coupler 40 is contoured to matingly fit with surface 64 of car body part 56 and surface 66 of car body part 58. The outside surfaces of sides 44, 46, and 48 of box-like coupler 40 are contoured to matingly fit with the inside surface (not shown) of car body parts 60 and 62.

As seen in FIG. 10, side 42 of box-like coupler 40 is to be secured to surfaces 64 and 66 of car body parts 56 and 58, respectively, so that centerline 54 of box-like coupler 40 is aligned with the line where car body parts 56 and 58 meet. Surface 64 of car body part 56 will extend over open end 50, and surface 66 of car body part 58 will extend over end 52 (not seen in FIG. 10) of box-like coupler 40. Securement of the coupler to the car body part may be accomplished using, e.g., adhesive or mechanical fasteners.

Thereafter, car body parts 60 and 62 are to be secured to sides 44, 46, and 48 of box-like coupler 40 so that centerline 54 of box-like coupler 40 is aligned with the line where car body parts 60 and 62 meet. Car body part 60 will extend over open end 50, and car body part 62 will extend over open end 52 (not seen in FIG. 10) of box-like coupler 40. Once again, securement of the car body parts to the coupler may be accomplished using, e.g., adhesive or mechanical fasteners. The dot-dash lines show the proper placement of box-like coupler 40 with car body parts 56, 58, 60, and 62. The fact that car body parts 56, 58, 60, and 62 will extend over both open ends of coupler 40 aids in the concealment of coupler 40 for aesthetic purposes.

Due to the size and shape of box-like coupler 40 relative to car body parts 56, 58, 60, and 62, coupler 40 adds reinforcement to the car body assembled from the car body parts.

FIGS. 6–8 show various views of a winged coupler of the present invention which is a device generally indicated by reference numeral 70. FIG. 9 shows winged coupler 72, which is another design of a winged coupler of the present invention. Winged couplers 70 and 72 are each useful for coupling at least two car body parts together.

FIG. 6 shows a top view of winged coupler 70, FIG. 7 shows an end view of winged coupler 70 as seen from the direction of arrows 7 in FIG. 6, and FIG. 8 shows a side view of winged coupler 70 as seen from the direction of arrows 8 in FIG. 6.

Winged coupler 70 includes first wing 74 and second wing 76 (which is connected to and symmetric with first wing 74), middle or centerline 78 (which divides first wing 74 and second wing 76), upper surface 80, lower surface 82, sides 84 and 86, ends 88 and 90, recessed areas 92 and 94 in upper surface 80, and pin 96 at centerline 78 extending outwardly from upper surface 80 and pin 98 at centerline 78 extending outwardly from lower surface 82. Sides 84 and 86 and ends 88 and 90 connect upper surface 80 to lower surface 82.

"Distal width" and "proximal width" are terms used herein which are relative to each other and to middle or centerline 78. Distal width is the width of winged coupler 70 as measured from side 84 to side 86 at a point along winged coupler 70 which is further from centerline 78 than is that point at which the proximal width is measured. Proximal width, too, is the width of winged coupler 70 measured from side 84 to side 86. In FIG. 6, distal width 100 and proximal width 102 are provided as examples of distal and proximal widths, respectively.

According to the invention, at least one distal width of each wing should be greater than a proximal width of the same wing. In other words, not every distal width must be greater than every proximal width, but at least one must be greater. This property in the structure of winged coupler 70 can serve as a locking mechanism for the car body parts which are coupled by the winged coupler. Typically, the car body parts which are to be coupled by winged coupler 70 have surfaces which are to abut winged coupler 70 and have mating contours to the exterior surface of winged coupler 70 (except that the surface of the car body parts does not usually mate with recessed areas 92 and 94).

As will be discussed further below, one car body part to be coupled is secured to first wing 74 of coupler 70 and the second car body part to be coupled is secured to second wing 76 of coupler 70. The fact that a distal width on each wing is greater than a proximal width on the same wing provides a mechanical lock of the two car body parts together.

One way to achieve having a distal width on each wing greater than a proximal width on each wing of a winged coupler is illustrated by winged coupler 70. Side 84 is tapered outwardly from centerline 78 to ends 88 and 90 so that side 84 is V-shaped and the middle of the device is narrower than the ends of the device.

In addition, as seen in FIG. 8, Upper surface 80 and lower surface 82 of winged coupler 70 are tapered from ends 88 and 90 to centerline 78. The tapering of upper and lower surfaces 80 and 82 is not critical to the invention, but is shown to illustrate that the surfaces may be contoured to mate with the shape of the car body parts to be coupled together.

Pins 96 and 98 are present as locating pins to assist in the positioning of winged coupler 70 with the car body parts to be coupled together. Winged coupler 70 would also benefit from having only one pin, on either upper surface 80 or lower surface 82, although it is preferred to have pins on both surfaces. The function of the pins will be discussed further below with respect to winged coupler 72.

The only difference between winged coupler 72 of FIG. 9 and winged coupler 70 of FIG. 6 is that winged coupler 72 has two sides, sides 84' and 86', which are V-shaped. The features of winged coupler 72 are labeled with the same reference numerals as those of winged coupler 70 except that the reference numerals for winged coupler 72 are suffixed with a prime (').

Winged couplers 70 and 72 may be formed from materials such as metal or plastic. FIG. 11 illustrates how coupler 72 may be used to couple four car body parts 108, 110, 112, and 114 together. Car body parts 108 and 110 are shown abutted together, as well as car body parts 112 and 114. Each of the four car body parts has a semicircular hole in an end thereof. Circular holes 116 and 118, formed when two of the car body parts are abutted, are sized so that either pin 96' or 98' (98' is not shown in FIG. 11), respectively, of winged coupler 72 may be placed therein.

To couple the four car body parts together, car body part 108 is abutted with car body 110 as shown. Winged coupler 72 is then placed against and secured to abutted car body parts 108/110 so that pin 96' is inserted into hole 116. To secure winged coupler 70 to abutted car body parts 108/110, adhesive may be used. Abutted car body parts 112/114 are then placed against and secured to winged coupler 72 so that pin 98' (not shown in FIG. 11) is inserted into hole 118.

Thus, pins 96' and 98' help to locate the proper location of winged coupler 72 between the car body parts. The dot-dash lines in FIG. 11 show the proper placement of winged coupler 72. Securing car body parts 112/114 to winged coupler 72 may be accomplished using adhesive. Recessed areas 92' and 94' not only render the winged coupler lighter in weight, but also provide a space for holding some of the adhesive. Due to the V-shaped sides 84' and 86' of winged coupler 72, the car body parts are less likely to separate in the direction of the arrows shown in FIG. 11.

Accordingly, the couplers of the present invention are useful for coupling one car body part, such as a car body panel, to another car body part, such as another car body panel. Some of the couplers of the present invention serve a function in addition to coupling, such as providing support or reinforcement to the coupled body parts. The couplers of the present invention are designed to be lightweight and may be secured in place with adhesive and, optionally, mechanical fasteners. The winged couplers illustrate how the couplers may be shaped to prevent separation of at least two car body parts in one direction and have means for locating the proper position of the coupler between the body parts.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A box-like coupler for coupling a first vehicle body part to a second vehicle body part, the box-like coupler comprising:

a box-like device having a closed perimeter of a plurality of sides, two open ends, and a center rib between the two open ends which extends to all of the sides of the plurality of sides, the center rib having holes therethrough, at least one side of the plurality of sides having rivet holes therethrough, the device having a centerline between the two open ends dividing the coupler in half, each half being symmetric with the other, at least one but less than all said sides adapted to be secured to each said vehicle body part, wherein said coupler is wider at said centerline than at least one said open end.

2. A box-like coupler for coupling a first vehicle body part to a second vehicle body part, the box-like coupler comprising:

a box-like device having a closed perimeter of a plurality of sides, two open ends, and a center rib between the two open ends which extends to all of the sides of the plurality of sides, the center rib having holes therethrough, at least one side of the plurality of sides having rivet holes therethrough, the device having a centerline between the two open ends dividing the coupler in half, each half being symmetric with the other, at least one but less than all said sides adapted to be secured to each said vehicle body part, and wherein said coupler is wider at said centerline than at both said open ends.

* * * * *